United States Patent
Moon et al.

(10) Patent No.: US 9,922,397 B2
(45) Date of Patent: Mar. 20, 2018

(54) TOUCH SENSITIVE IMAGE DISPLAY SYSTEM HAVING REDUCED LAG

(71) Applicant: Samsung Display Co., Ltd., Yongin-si, Gyeonggi-do (KR)

(72) Inventors: Gyeong Ub Moon, Yongin-si (KR); Sang Ho Park, Yongin-si (KR); Ji Hong Park, yongin-si (KR); Moon Sung Choi, Yongin-si (KR); Sang Min Choi, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 15/297,994

(22) Filed: Oct. 19, 2016

(65) Prior Publication Data

US 2017/0123589 A1 May 4, 2017

(30) Foreign Application Priority Data

Oct. 30, 2015 (KR) ........................ 10-2015-0152310

(51) Int. Cl.
*G06F 3/02* (2006.01)
*G09G 3/20* (2006.01)
*G06T 1/20* (2006.01)
*G06F 3/041* (2006.01)

(52) U.S. Cl.
CPC .............. *G06T 1/20* (2013.01); *G06F 3/0416* (2013.01); *G09G 3/20* (2013.01)

(58) Field of Classification Search
CPC ................................ G06F 3/0416; G09G 3/20
See application file for complete search history.

(56) References Cited

U.S. PATENT DOCUMENTS

| 2010/0066692 A1* | 3/2010 | Noguchi | G06F 3/0412 345/173 |
| 2010/0277429 A1* | 11/2010 | Day | G06F 3/0416 345/173 |
| 2011/0310118 A1* | 12/2011 | Asmi | G06F 3/04883 345/619 |
| 2015/0062081 A1 | 3/2015 | Lee et al. | |
| 2015/0077370 A1 | 3/2015 | Kim et al. | |

FOREIGN PATENT DOCUMENTS

KR 10-2015-0026040 A 3/2015
KR 10-2015-0032409 A 3/2015

* cited by examiner

*Primary Examiner* — Kevin M Nguyen
(74) *Attorney, Agent, or Firm* — Innovation Counsel LLP

(57) ABSTRACT

There is provided an image display system. The image display system includes a touch controller configured to generate first touch event information and second touch event information each corresponding to a touch signal output from a touch panel, a display data generating unit configured to generate first display data to be displayed during one frame in response to the first touch event information, a graphic processing unit (GPU) configured to combine second display data with the first display data so as to generate output image data, the second display data corresponding to the second touch event information supplied from the touch controller, and a display controller configured to supply output image data generated by the GPU to a display panel.

10 Claims, 5 Drawing Sheets

TA

TA

TOUCH SENSITIVE IMAGE DISPLAY SYSTEM HAVING REDUCED LAG

CROSS-REFERENCE TO RELATED APPLICATION

This application claims priority to, and the benefit of, Korean Patent Application No. 10-2015-0152310, filed on Oct. 30, 2015 in the Korean Intellectual Property Office, the contents of which are incorporated herein by reference in their entirety.

BACKGROUND

1. Field

An embodiment of the present invention relates generally to image display systems, and more particularly, to image display systems capable of reducing a display lag regarding a touch input.

2. Description of the Related Art

A touch screen is a type of input device installed in an image display device such as a liquid crystal display (LCD), a field emission display (FED), a plasma display panel (PDP), an electroluminescence (EL) device, or an electrophoretic display. The touch screen allows a user to press or touch a touch sensor therein to input predetermined information, while viewing the image display device.

In particular, recently, demand for in-cell type touch screen integrated display devices, in which elements forming a touch screen are installed in a display device to reduce a thickness of portable terminals such as a smartphone or a tablet PC, is increasing.

In a general in-cell type touch screen display device, touch data is transmitted for every vertical synchronization signal (Vsync) defining a frame period.

Here, a frequency at which new data is transmitted to every pixel of a panel is called a display frame rate, and when touch data is transmitted to a system each frame period as described above, an amount of data to be processed is increased, and thus, it is difficult to enhance a frequency.

In addition, since touch data is transmitted to a system each frame period, a response with respect to a touch event may be delayed, and thus, feedback is not immediately provided for a touch input of a user, increasing user dissatisfaction.

SUMMARY

An embodiment of the present invention relates to an image display system for reducing a lag time between a touch event and a corresponding displayed response.

An image display system according to an embodiment of the present invention includes: a touch controller configured to generate first touch event information and second touch event information each corresponding to a touch signal output from a touch panel; a display data generating unit configured to generate first display data to be displayed during one frame in response to the first touch event information; a graphic processing unit (GPU) configured to combine second display data with the first display data so as to generate output image data, the second display data corresponding to the second touch event information supplied from the touch controller; and a display controller configured to supply output image data generated by the GPU to a display panel.

For the displaying of an nth (n is a natural number) frame, and when the first touch event information is generated before the nth frame is displayed, the display data generating unit may generate first display data comprising an entire frame of data before the nth frame is displayed.

The GPU may render the output image data to be supplied to each horizontal line provided in the display panel, and to output the rendered image data to the display controller.

The touch controller may supply the first touch event information and second touch event information to the display data generating unit or the GPU at a timing synchronized with an output timing of the display panel.

The touch controller may be further configured to generate the second touch event information when an image is displayed up to an ith (i is a natural number) horizontal line on the display panel, but a touch is detected at a region of the touch panel corresponding to a horizontal line subsequent to the ith horizontal line.

The touch controller may supply the second touch event information at a timing synchronized with an output timing of the display panel.

When the touch is detected at a region of the touch panel corresponding to a jth (j is a natural number greater than i) horizontal line of the display panel, the GPU may update the image data to be supplied to the jth horizontal line with reference to the second touch event information before an image is displayed in the jth horizontal line.

The second touch event information generated while the nth frame is being displayed may be designated as first touch event information of the (n+1)th frame.

The touch controller may sense the touch signal in an overlapping manner such that each horizontal line of the touch panel is sensed at least two times during one frame.

When a predetermined touch signal is generated while a still image is being displayed on the display panel, only image data supplied to a horizontal line corresponding to the predetermined touch signal may be updated.

According to embodiments of the present invention, it is possible to provide an image display system capable of reducing a lag time between display responses regarding a touch event.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. The various figures are thus not necessarily to scale. It will be understood that when an element is referred to as being "between" two elements, it can be the only element between the two elements, or one or more intervening elements may also be present. Like reference numerals refer to like elements throughout.

DETAILED DESCRIPTION

Figure 1:
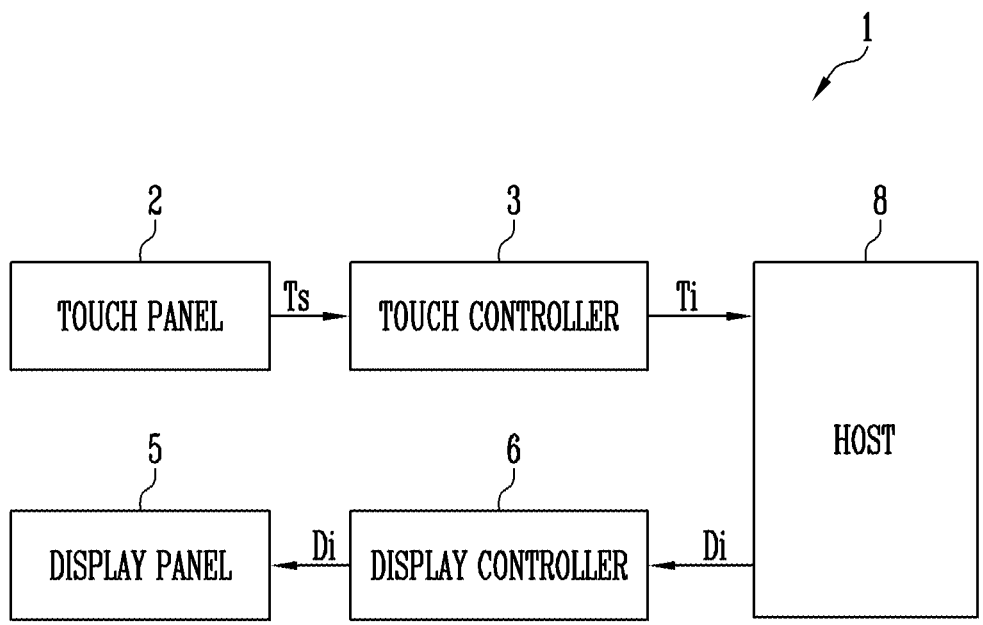
FIG. 1 is a view illustrating a configuration of an image display system according to an embodiment of the present invention.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. All numerical values are approximate, and may vary. All examples of specific materials and compositions are to be taken as nonlimiting and exemplary only. Other suitable materials and compositions may be used instead.

Hereinafter, embodiments will be described in detail with reference to the accompanying drawings such that they can be easily practiced by those skilled in the art to which the present invention pertains.

FIG. 1 is a view illustrating a configuration of an image display system according to an embodiment of the present invention.

Referring to FIG. 1, an image display system 1 may include a touch panel 2, a touch controller 3, a display panel 5, a display controller 6, and a host 8.

The touch panel 2 may detect a touch by a user and generate a touch signal Ts supplied to the touch controller 3. For this purpose, the touch panel 2 may be connected to the touch controller 3.

Here, the touch panel 2 may detect a touch of a user who uses a certain type of pointing implement such as a body part (for example, a finger) or a stylus.

As used in an embodiment of the present invention, the term "pointing element" refers to any object that may be detected by the touch panel 2, including devices such as a stylus or body parts such as a finger.

The touch panel 2 may be implemented as any touch-sensitive panel, such as one of a capacitive type touch panel, a resistive type touch panel, an optical touch panel, a surface acoustic wave touch panel, a pressure touch panel, and a hybrid touch panel. Here, the hybrid type touch panel may be implemented by coupling homogeneous touch panels or heterogeneous touch panels. However, the touch panel 2 used in an embodiment of the present invention is not limited to any of the aforementioned panel types, and any type of panel may be used as long as it can detect a touch by a pointing implement.

For example, a touch signal Ts output from the touch panel 2 may correspond to a measurement value of capacitance, a voltage, or a current regarding each position within the touch panel 2.

The touch controller 3 may generate information Ti regarding a touch event generated in the touch panel 110, by using the touch signal Ts supplied from the touch panel 2. Here, the touch controller 3 may supply generated touch event information Ti to the host 8. In detail, the touch controller 3 may supply the generated touch event information Ti to a data generating unit provided in the host 8.

Also, the touch controller 3 may simultaneously supply the generated touch event information Ti to a display data generating unit and a graphic processing unit provided in the host 8. For this purpose, the touch controller 3 may be connected to the host 8.

The touch event information Ti may be data corresponding to a position (for example, coordinates) at which the touch event was generated by the user. In addition, according to another embodiment, the touch event information Ti may further include pressure data corresponding to pressure applied to the touch panel 2.

The host 8 may receive the touch event information Ti supplied from the touch controller 3, generate image data Di with reference to the touch event information Ti, and supply the generated image data Di to the display controller 6. Also, the host 8 may supply general image data unrelated to a touch event to the display controller, to display an image unrelated to a touch on the display panel 5. For this purpose, the host 8 may be connected to the display controller 6.

After the touch panel 2 is formed separately from the display panel 5, the touch panel 2 may be arranged at one side of the display panel 5, or embedded in the display panel 5.

Figure 2:
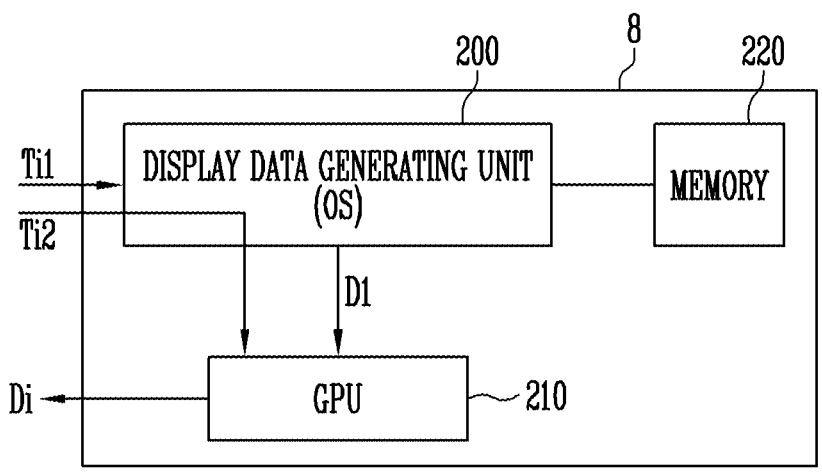
FIG. 2 is a view illustrating an internal configuration of a host according to an embodiment of the present invention.

FIG. 2 is a view illustrating an internal configuration of a host according to an embodiment of the present invention.

Referring to FIG. 2, the host 8 according to an embodiment of the present invention may include a display data generating unit 200 and a graphic processing unit (GPU) 210. Also, the host 8 according to an embodiment of the present invention may further include a memory 220 in addition to the display data generating unit 200 and the graphic processing device 210.

In the present disclosure, for convenience, a unit for processing touch event information Ti is referred to as the display data generating unit 200, and any control program capable of performing an interface role between hardware and an application program, for example a general operating system (OS), may be the display data generating unit 200.

The touch event information Ti supplied from the touch controller 3 to the host 8 may include at least any one of first touch event information Ti1 and second touch event information Ti2.

The second touch event information Ti2 may be generated by a touch signal input to a region corresponding to a horizontal line of the display panel 5 not displayed yet. That is, during an nth (n is a natural number) frame period, second touch event information Ti2 may be generated if a touch is detected in an area corresponding to a horizontal line of the nth frame that has not yet been displayed.

The first touch event information Ti1 may be generated by a touch signal input before the nth frame is displayed on the display panel 5.

The display data generating unit 200 may generate display data D1 related a touch event generated in the display panel 5 with reference to the touch event information Ti1. The display data generating unit 200 may output the generated display data D1 to the GPU 210.

The GPU may perform a function of receiving the image data D1 output from the display data generating unit 200 and rendering the received image data D1.

Although not shown, the GPU 210 may include a frame buffer for storing display data D1 output from the display data generating unit 200. Indeed, a plurality of such frame buffers may be provided, and when a touch event is input to the display panel 5 while an nth frame is being displayed on the display panel 5, related display data may be updated in a different frame buffer. Thus, during an (n+1)th frame, the display data stored in this different frame buffer may be displayed on the display panel 5.

When the second touch event information Ti2 is output from the touch controller 3, the GPU 210 may perform a function of combining display data based on the second touch event information Ti2 with the display data D1 output from the display data generating unit 200, and rendering the combined data. In particular, in order to reflect and display the display data based on the second touch event information Ti2 on the display panel 5 in real time, the GPU 210 may not simultaneously render the entire display data of one frame, but instead may render display data on a horizontal line-by horizontal line basis. That is, the GPU 210 according to an embodiment of the present invention may render data in units of horizontal lines, not in units of frames, to output image data Di.

For this purpose, the touch controller 3 may sense a touch signal in units of horizontal lines of the touch panel 2. That is, touch signal sensing by the touch controller 3 and frame scanning by the display controller 6 may be performed synchronously.

The display controller 6 may play a role of controlling driving of the display panel 5. That is, in order to display a predetermined image on the display panel 5, the display controller 6 may synchronize image data supplied from the outside to a specific timing and supply the image data to the display panel 5. For example, the display controller 6 may receive output image data Di generated by the host 8, synchronize the received output image data Di to a predetermined control signal, and supply the image data Di to the display panel 5 in synchronized manner.

In detail, the display controller 6 may receive the output image data Di generated by rendering only the display data D1 output from the display data generating unit 200, synchronize the output image data Di to a predetermined control signal, and supply the output image data D1 to the display panel 5.

Also, the display controller 6 may receive the output image data Di obtained by combining display data corresponding to the second touch event information Ti2 with the display data D1 output from the display data generating unit 200. It may then synchronize the output image data Di to a predetermined control signal, and supply the output image data Di to the display panel 5.

The display panel 5 may display a predetermined image to correspond to the image data Di supplied from the display controller 6. For example, the display panel 5 may display an image corresponding to the image data Di supplied from the host 8 through the display controller 6.

The display panel 5 may be implemented as various display panels such as a liquid crystal display, a plasma display panel, or an organic light emitting display panel.

Also, the display panel 5 according to an embodiment of the present invention may include a plurality of pixels (not shown), a scan driver (not shown) for supplying a scan signal to the pixels, and a data driver (not shown) for supplying a data signal corresponding to the image data supplied from the display controller 6 to the pixels.

Here, the scan driver may simultaneously supply the scan signal to every pixel of a horizontal line. Also, the scan lines transferring a scan signal to each pixel may be formed to extend in a horizontal direction (or in a traverse direction), and the scan signal may be sequentially supplied in a vertical direction (or in a longitudinal direction). That is, an image may be sequentially displayed in each horizontal line of the display panel 5.

Figure 3A:
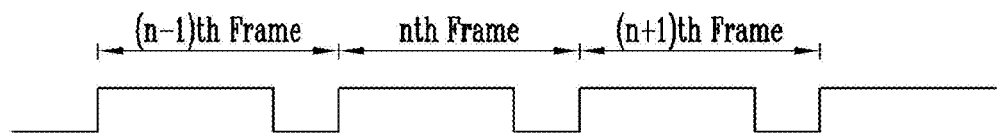
FIG. 3A is a waveform diagram illustrating a display section and a blank section included in one frame.
Figure 3B:
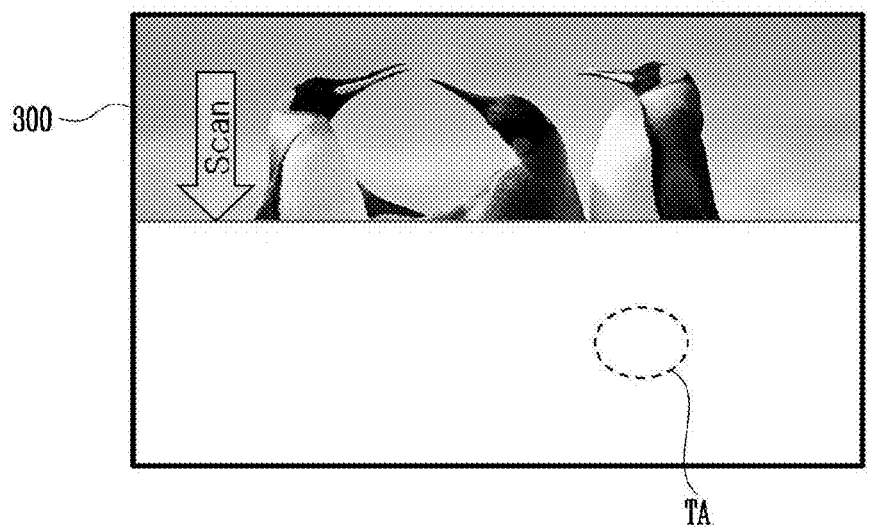
FIG. 3B is a view illustrating a conventional touch signal sensing method and conventional image display method.
Figure 3C:
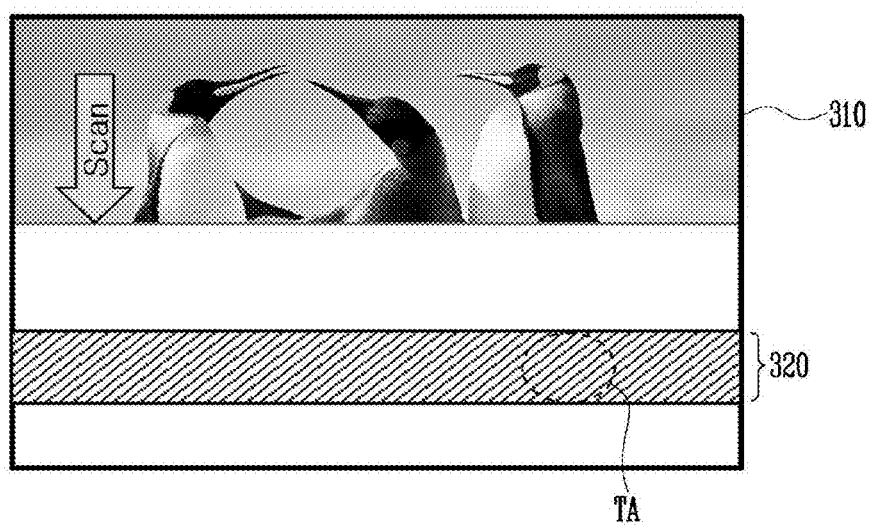
FIG. 3C is a view illustrating a touch signal sensing method and an image display method according to an embodiment of the present invention.
Figure 4A:
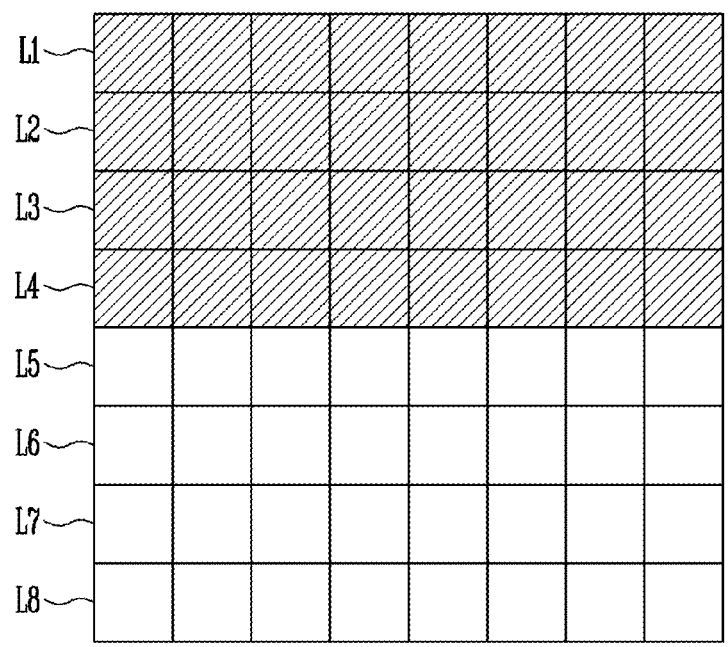
FIGS. 4A, 4B, 4C, and 4D are views illustrating a data sampling method according to another embodiment of the present invention.
Figure 4B:
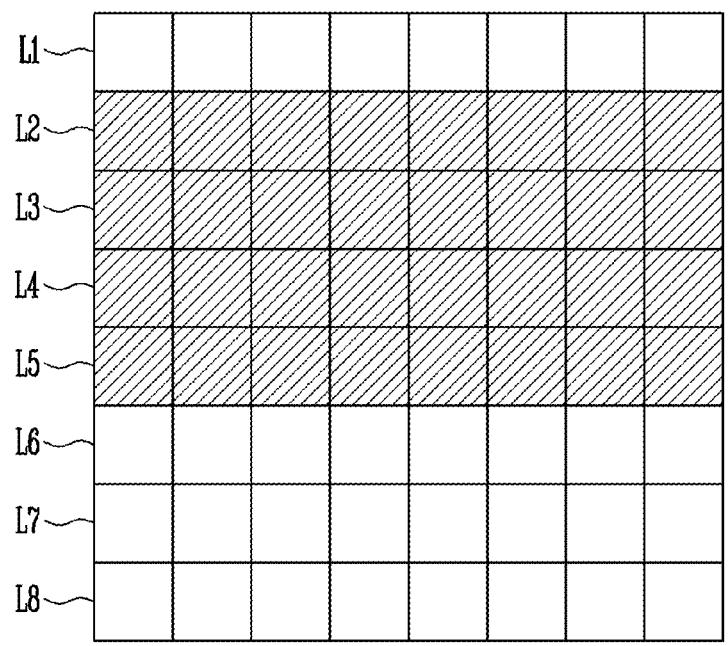
Figure 4C:
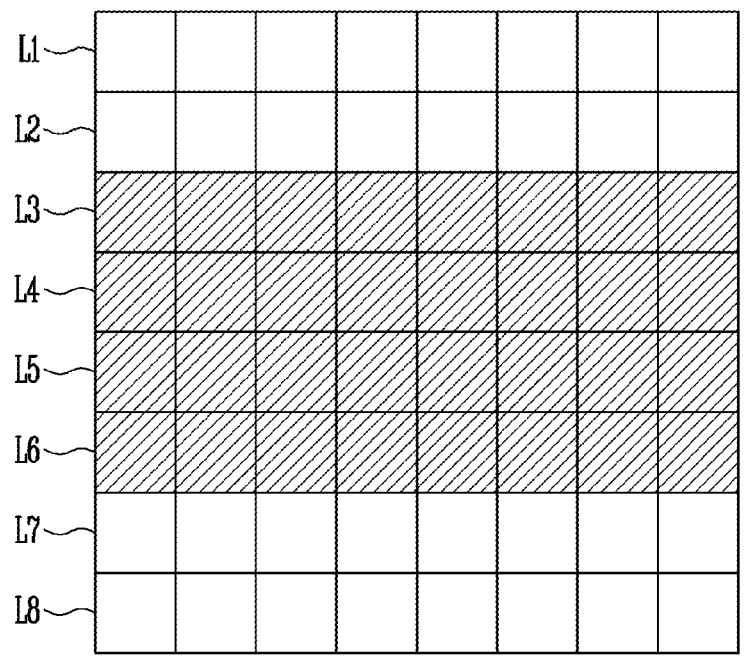
Figure 4D:
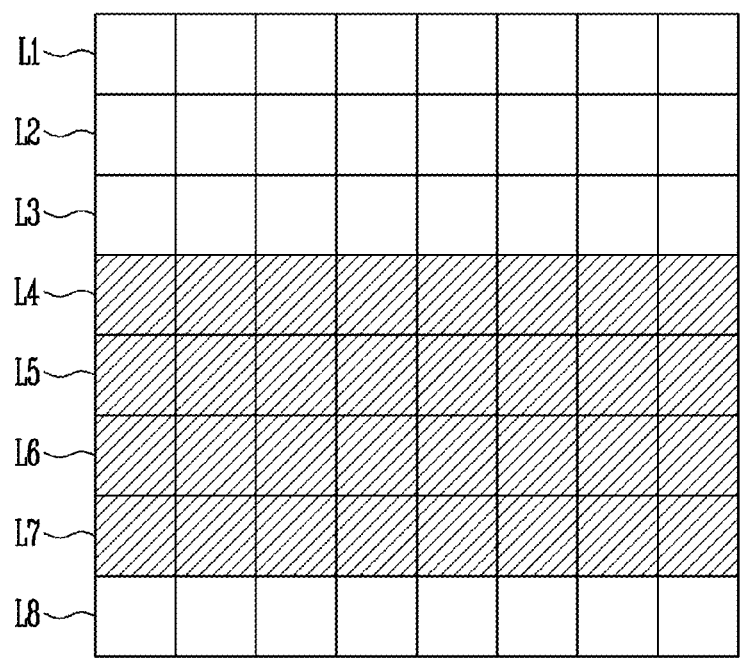

FIGS. 3A through 3C are views illustrating an image display method according to an embodiment of the present invention.

In detail, FIG. 3A is a waveform diagram illustrating a display section and a blank section included in one frame.

Referring to FIG. 3A, the waveform portions having a high level are display sections, and the other sections, that is, the sections illustrated to have a low level, may be blank sections in each frame.

For example, when two frame buffers (for example, a first frame buffer and a second frame buffer) are provided to display each frame on a display panel, image data updated and stored in the first frame buffer may be displayed as an nth frame.

While the nth frame is being displayed, image data corresponding to an (n+1)th frame may be updated in the second frame buffer.

While the image data corresponding to the nth frame is being sequentially scanned along the horizontal line of the display panel 5, a touch event may be input to the display panel 5. When this happens, image data corresponding to the touch event is updated to the second frame buffer.

That is, according to the conventional method of processing data by using one frame as a basic unit, even though a touch event is input while the nth frame is being displayed, an image corresponding thereto is displayed in the (n+1)th frame, and thus, a frame lag occurs.

FIG. 3B is a view illustrating display of an nth frame according to the conventional image display method.

Referring to FIG. 3B, on the display panel, an image corresponding to the nth frame is sequentially displayed along the horizontal lines. In detail, in FIG. 3B, it is assumed that a state in which the image is displayed up to an ith horizontal line is illustrated.

According to the conventional image display method, as illustrated in FIG. 3B, even though a touch event is input to a predetermined area TA, a previously updated image corresponding to the nth frame is sequentially displayed, and an image generated with reference to the touch event information may not be reflected in the nth frame. Instead, image data corresponding to the touch event may only be applied to a subsequent frame.

FIG. 3C is a view illustrating display of an nth frame according to an image display method of an embodiment of the present invention.

Here, a display panel 310 illustrated in FIG. 3C and the display panel 5 illustrated in FIG. 1 may be the same component.

Referring to FIG. 3C, an image corresponding to an nth frame may be displayed sequentially along a horizontal line on the display panel 310. In detail, it is also assumed that FIG. 3C schematically illustrates a state in which horizontal lines up to an ith one are displayed as in FIG. 3B.

According to an embodiment of the present invention, the display data generating unit 200 may generate the entire image data corresponding to an nth frame with reference to touch event information (which corresponds to the aforementioned first touch event information) according to a touch signal input before the nth frame is displayed.

In the case in which there is no touch event input to the touch panel 2, general image data unrelated to a touch event is generated.

The entire image data corresponding to the nth frame generated by the display data generating unit 200 is rendered by the graphic processing device 210, and the rendered image data may be displayed on the display panel through the display controller 6.

Thus, as illustrated in FIG. 3C, an image may be sequentially displayed along the horizontal lines.

Here, in the case in which the nth frame is displayed up to an ith horizontal line of the display panel 310, a touch event (which corresponds to the aforementioned second touch event information and which may be referred to as second touch event information hereinafter) input to a region of the touch panel corresponding to a line after the ith line of the display panel 310 may be sensed and a corresponding touch signal may be output to the touch controller 3.

That is, as illustrated in FIG. 3C, in the case in which a touch event is input to a predetermined region TA corresponding to a region of the display panel 310 in which an image is not displayed yet, the touch controller 3 supplies touch event information regarding the touch event to the host 8.

As described above, the touch controller 3 may sense a touch signal in units of horizontal lines of the touch panel 2, generate touch event information regarding the sensed touch signal, and supply the generated touch event information to the host 8.

The GPU 210 according to an embodiment of the present invention may render display data in units of horizontal lines, not in units of frames, and output the rendered display data to the display controller 6.

For example, in the case in which a touch event is input to the touch panel 2 corresponding to a jth (a natural number greater than i) horizontal line while the nth frame is being displayed, the GPU 210 may combine display data associated with the jth line of the nth frame of display data D1, with display data generated with reference to second touch event information Ti2 corresponding to the touch event. The GPU 210 may then render this combined data. That is, since the GPU 210 renders image data corresponding to the second touch event information Ti2, and outputs the rendered data to the display controller 6 before the jth horizontal line is displayed, an image including the second touch event information Ti2 may be displayed while the nth frame is being displayed.

For example, as illustrated in FIG. 3C, image data to be displayed in the horizontal lines 320, corresponding to the region in which the touch event has been input, may be updated while the nth frame is being displayed. That is, according to the embodiment of the present invention, by synchronizing sensing of a touch signal and rendering of display data to an image output timing, the image data reflecting the second touch event information Ti2 may be updated and output before the image corresponding to the jth horizontal line is output.

Thus, while display lag of about one frame occurs with respect to a conventional touch event input, display lag time of embodiments of the invention may be considerably lower.

FIGS. 4A to 4D are views illustrating a data sampling method according to another embodiment of the present invention.

In general, when a touch signal is sensed, multi-sampling is performed on automated data collection (ADC) data in order to enhance signal-to-noise ratio (SNR) characteristics, and the like. Furthermore, in the conventional art, since sensed data is processed in units of individual frames, multi-sampling is performed on one entire frame at a time. Therefore, in order to perform multi-sampling, a plurality of frames must first be collected, and thus, a time corresponding to a frame frequency is required for multi-sampling.

According to another embodiment of the present invention, a touch signal is sensed according to horizontal lines of the touch panel 2, and the touch signal may be sensed in units of a plurality of horizontal lines such that a predetermined horizontal line may be sensed in an overlapping manner several times.

For example, as illustrated in FIGS. 4A through 4D, when it is assumed that four horizontal lines are sensed each time, in the case in which first data is sensed, data regarding first to fourth horizontal lines L1 to L4 may be sensed.

Thereafter, when second data is sensed, data regarding second to fifth horizontal lines L2 to L5 may be sensed. When third data is sensed, data regarding third to sixth horizontal lines L3 to L6 may be sensed. When fourth data is sensed, data regarding fourth to seventh horizontal lines L4 to L7 may be sensed.

That is, whenever fourth data is sensed, data regarding the fourth horizontal line L4 may be sensed. In the conventional art, a time corresponding to four frames is required to collect the same amount of data, but according to an embodiment of the present invention, ADC data for multi-sampling may be collected while one frame is being displayed. Thus, a time required for multi-sampling may be reduced.

Also, according to the conventional art, since data regarding all touch signals input to one frame are sensed, an amount of data to be processed is increased. In contrast, according to an embodiment of the present invention, touch input data sensing is based on a scan method, that is, a horizontal line unit, and thus, an amount of data to be processed over a given time period, e.g. one frame period, may be reduced. Thus, the number of sampling frequencies or the number of samplings may be increased as much as the reduced amount of data so that accuracy of multi-sampling may be enhanced.

Figure 5A:
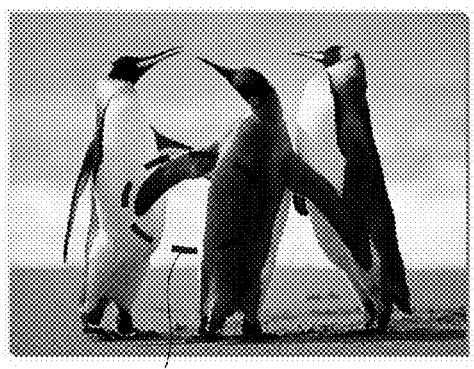
FIG. 5A is a view illustrating a conventional screen update in response to a touch event input while a still image is displayed.
Figure 5A:
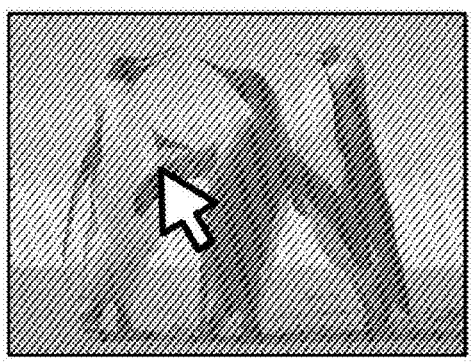
Figure 5B:
FIG. 5B is a view illustrating a screen update in response to a touch event input while a still image is displayed, performed in accordance with an embodiment of the present invention.
Figure 5B:
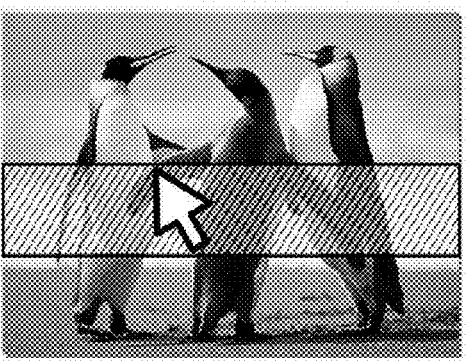

FIGS. 5A and 5B are views illustrating a comparison between a conventional image display method and an image display method according to an embodiment of the present invention.

FIG. 5A illustrates a conventional screen update in response to a touch event input while a still image is being displayed, and FIG. 5B illustrates a corresponding screen update according to an embodiment of the present invention.

In general, a host 8 generates image data corresponding to an entire frame during each frame period, and supplies the entire frame of image data to the display controller 6.

However, in the case in which a screen displayed on the display panel 5 is a still image (when the same screen is continuously maintained without a change, it is considered as a still image), the same frame may be maintained to be continuously displayed in order to reduce power consumption.

When a predetermined touch event is input while the same frame is continuously displayed, an image reflecting touch event information regarding the touch event is updated and displayed.

In detail, a touch event is input to a predetermined region TA while a still image is being displayed on the display panel as illustrated in the left drawing of FIG. 5A. Updating is performed such that a cursor having an arrow shape is displayed in the predetermined region TA, as illustrated in the right drawing of FIG. 5A.

However, in the conventional art, since image data is rendered in units of an entire frame, even though a portion of a still image is changed, the entire screen must be updated.

As previously mentioned, FIG. 5B illustrates a method for updating a screen according to an embodiment of the present invention when a touch event is input in a state in which a still image is displayed.

When a touch event is input to a predetermined region TA while a still image is being displayed on the display panel as illustrated in the left drawing of FIG. 5B, updating may be performed such that a cursor having an arrow shape is displayed in the predetermined region TA. This is illustrated in the right drawing of FIG. 5B.

According to embodiments of the present invention, since image data is rendered in units of one or more horizontal lines, only image data for horizontal lines (a portion displayed with oblique lines in the right drawing of FIG. 5B) in which a touch event is input need be updated. Thus, since an amount of data to be processed is reduced, power consumption may be further reduced, compared with the conventional art.

The representation of the oblique lines in FIGS. 5A and 5B show a visual comparison between regions of screens updated according to the conventional art and according to an embodiment of the present invention.

As described above, in the conventional art, since data corresponding to a touch signal is collectively received in units of one frame or several frames, a one- or several-frame lag occurs for output image data to reflect data regarding the touch signal.

Thus, even though a sensing frequency value is increased to increase a response speed, image data reflecting touch input data sensed in the corresponding frame is still displayed in a next frame.

However, according to an embodiment of the present invention, a touch signal is sensed in units of horizontal line of the touch panel 2, and display data corresponding to the touch input data may be rendered in the same frame. Thus, a display lag time according to a touch input may be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims. Various features of the above described and other embodiments can be mixed and matched in any manner, to produce further embodiments consistent with the invention.

What is claimed is:

1. An image display system comprising:
a touch controller configured to generate first touch event information and second touch event information each corresponding to a touch signal output from a touch panel;
a display data generating unit configured to generate first display data to be displayed during one frame in response to the first touch event information;
a graphic processing unit (GPU) configured to combine second display data with the first display data so as to generate output image data, the second display data corresponding to the second touch event information supplied from the touch controller; and
a display controller configured to supply the output image data generated by the GPU to a display panel.

2. The image display system of claim 1, wherein, for the displaying of an nth (n is a natural number) frame, and when the first touch event information is generated before the nth frame is displayed, the display data generating unit generates the first display data comprising an entire frame of data before the nth frame is displayed.

3. The image display system of claim 2, wherein the GPU is further configured to render the output image data to be supplied to each horizontal line provided in the display panel, and to output the rendered image data to the display controller.

4. The image display system of claim 3, wherein the touch controller is further configured to supply the first touch event information and second touch event information to the display data generating unit or the GPU at a timing synchronized with an output timing of the display panel.

5. The image display system of claim 4, wherein the touch controller is further configured to generate the second touch event information when an image is only displayed up to an ith (i is a natural number) horizontal line on the display panel, but a touch is detected at a region of the touch panel corresponding to a horizontal line subsequent to the ith horizontal line.

6. The image display system of claim 5, wherein the touch controller is further configured to supply the second touch event information at a timing synchronized with an output timing of the display panel.

7. The image display system of claim 6, wherein when the touch is detected at a region of the touch panel corresponding to a jth (j is a natural number greater than i) horizontal line of the display panel, the GPU is further configured to update the image data to be supplied to the jth horizontal line with reference to the second touch event information before an image is displayed in the jth horizontal line.

8. The image display system of claim 7, wherein the second touch event information generated while the nth frame is being displayed is designated as first touch event information of the (n+1)th frame.

9. The image display system of claim 4, wherein the touch controller is configured to sense the touch signal in an overlapping manner such that each horizontal line of the touch panel is sensed at least two times during one frame.

10. The image display system of claim 4, wherein, when a predetermined touch signal is generated while a still image is being displayed on the display panel, only image data supplied to a horizontal line corresponding to the predetermined touch signal is updated.

* * * * *